(12) United States Patent
Blake, III et al.

(10) Patent No.: US 9,021,363 B2
(45) Date of Patent: Apr. 28, 2015

(54) CENTRALIZED USER PREFERENCE MANAGEMENT FOR ELECTRONIC DECISION MAKING DEVICES

(75) Inventors: Norman Perkins Blake, III, Zionsville, IN (US); Christopher Lee Collier, Avon, IN (US); George Mark McGregor, Pine Village, IN (US); Vincent Robert Koser, West Lafayette, IN (US)

(73) Assignee: NCR Corporation, Duluth, GA (US)

( * ) Notice: Subject to any disclaimer, the term of this patent is extended or adjusted under 35 U.S.C. 154(b) by 410 days.

(21) Appl. No.: 12/915,235

(22) Filed: Oct. 29, 2010

(65) Prior Publication Data
US 2012/0110467 A1   May 3, 2012

(51) Int. Cl.
G06F 3/00 (2006.01)
G06F 9/445 (2006.01)
G06F 9/44 (2006.01)

(52) U.S. Cl.
CPC ............ *G06F 9/4451* (2013.01); *G06F 9/4446* (2013.01)

(58) Field of Classification Search
None
See application file for complete search history.

(56) References Cited

U.S. PATENT DOCUMENTS

| | | | |
|---|---|---|---|
| 2002/0143961 A1* | 10/2002 | Siegel et al. | 709/229 |
| 2005/0018883 A1* | 1/2005 | Scott | 382/115 |
| 2006/0053378 A1* | 3/2006 | Fano et al. | 715/747 |
| 2007/0053513 A1* | 3/2007 | Hoffberg | 380/201 |
| 2007/0061266 A1* | 3/2007 | Moore et al. | 705/51 |
| 2009/0043644 A1* | 2/2009 | Wilkman | 705/10 |
| 2009/0254476 A1* | 10/2009 | Sharma et al. | 705/39 |
| 2009/0327915 A1* | 12/2009 | Holdaway et al. | 715/745 |

* cited by examiner

*Primary Examiner* — Anil N Kumar
(74) *Attorney, Agent, or Firm* — Joseph P. Mehrle (57) ABSTRACT

Systems and techniques for centralized user preference management for electronic decision making devices are provided. A user preference profile is received. A user preference profile manager may transmit a user preference from the user preference profile to a requesting user transaction terminal. the user preference manager may also receive a dynamic user preference from a user preference profile and extend the user preference profile with the dynamic user preference, where the dynamic user preference includes a preference definition and the preference definition includes read and write access controls for the dynamic user preference. Then the user manager may update the user preference profile based on data received from the user transaction terminal.

18 Claims, 4 Drawing Sheets

CENTRALIZED USER PREFERENCE MANAGEMENT FOR ELECTRONIC DECISION MAKING DEVICES

BACKGROUND

Customers typically interact with a large number of electronic devices upon which they make decisions. Often, these decisions involve the purchase of items or services and the devices may be thought of as user transaction terminals. Customers may interact, directly or indirectly, with user transaction terminals as varied as point-of-sale ("POS") terminals, self-service terminals ("Kiosks"), fuel pumps, mobile device applications, and websites, to name a few. Retailers have typically attempted to provide a good experience to customers in order to maintain customer loyalty and to increase revenue. Generally, however, retailers have been forced to manage users in an identical manner across electronic decision making devices, or retailers could only customize the user experience on a few types of devices (e.g., web sites).

SUMMARY

In various embodiments, systems and methods for centralized user preference management for electronic decision making devices are presented. According to an embodiment, a method for centralized user preference management for electronic decision making devices is provided. In a system having a plurality of user transaction terminals including a plurality of device types, a user preference profile associated with a user is received. In response to a request from a user transaction terminal, a user preference from the user preference profile is transmitted. A dynamic user preference to extend the user preference profile is received. The dynamic user preference including a definition for the preference which includes access controls to control both read and write access to the dynamic user preference. The user preference profile is updated based on data received from the user transaction terminal.

BRIEF DESCRIPTION OF THE DRAWINGS

Some embodiments are illustrated by way of example and not limitation in the figures of the accompanying drawings in which.

DETAILED DESCRIPTION

Example methods and systems for centralized user preference management for electronic decision making devices are described. In the following description, for purposes of explanation, numerous specific details are set forth in order to provide a thorough understanding of an embodiment of the present disclosure. It will be evident, however, to one of ordinary skill in the art that the present disclosure may be practiced without these specific details.

Retailers wishing to provide a personal experience to customers across a variety of user transaction terminals have been limited by both the user device capabilities and the difficulty in managing many disparate systems. Even when a number of devices allow for some preference management, there has not yet been a central repository of preferences to serve the needs of many different types of user transaction terminals and users. For example, retailers may be able to provide customer specific information, offers, suggestions, themes on some devices some of the time. Currently, however, these offerings typically involve disparate mechanisms which cannot communicate to one another. Additionally, the customer must interact with each of these separate systems and repeat the personalization process, repeatedly making the same preference selections, to express how they want to have their shopping experience delivered. Lastly, there currently is no integrated mechanism to dynamically impact a customer's experience based on a customer's current interaction with a user transaction terminal of the franchise. Accordingly, retailers cannot offer consistent messaging, customer centric personalization themes, security attributes for each individual across the franchise.

Integrating the personalization attributes and selections of many customers across many or all available customer interaction points may allow the retailer to truly manage the whole customer experience. A central repository containing a customer's user preference profile and communicating with the many different user transaction terminals may be used. A web-based portal may, in some examples, also be used to accept user entered selections and communicate them to the central repository. These selections may then be communicated throughout the integrated system including: point-of-sale machines, automatic teller machines, entertainment distribution devices, websites, mobile applications, self checkout devices, among other user transaction terminals. Additionally, a customer's interaction with many of the user transaction terminals may dynamically update the customer's global user preference profile. The interactions may be direct customer based updates to their preferences, or indirect updates. Indirect updates may include customer preferences obtained by observing the customer's interaction with a user transaction terminal, as opposed to the explicit choices made in direct updates. Indirect updates may include updates to a customer's purchasing velocity file, security settings, favorites inferred from each device and more.

By using a central preference repository and delivering the customer's preferences to the user transaction terminals, a retailer may enhance the customer's experience. The personalization relationship between the retailer and customer may help solidify the ongoing loyalty and commitment to one another, entrenching the retailer into the daily habits and lives of customers. Further, by consolidating user preferences, efficiencies may be experienced in both technical operating costs and marketing and advertising costs. Thus, meeting the ultimate goal of the retailed to increase revenue by encouraging customer sales and reducing costs in that effort.

Figure 1:
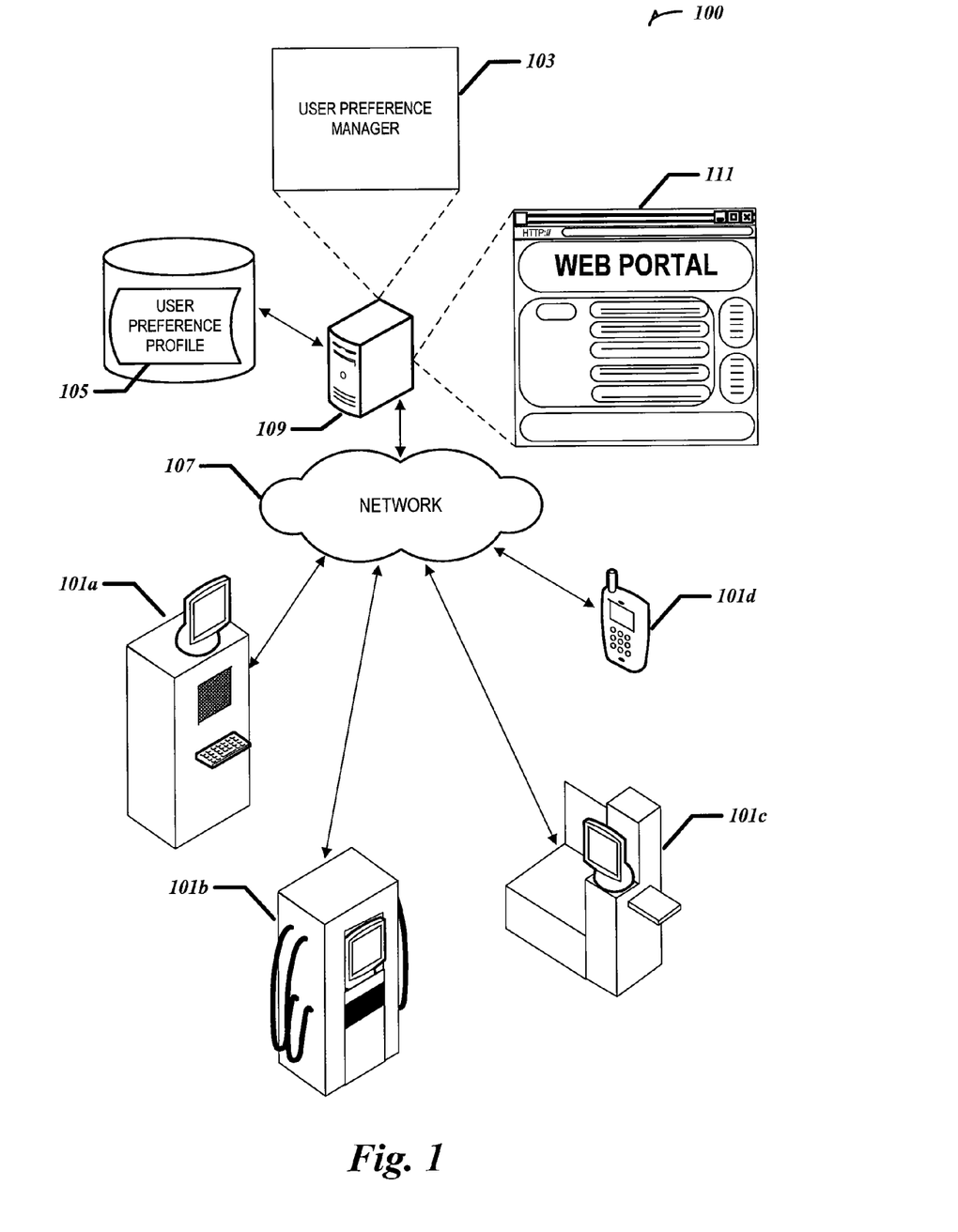
FIG. 1 is a block diagram illustrating an example system for centralized user preference management for electronic decision making devices.

FIG. 1 is a block diagram illustrating an example system 100 for centralized user preference management for electronic decision making devices. System 100 may include a plurality of user transaction terminals 101*a*-101*d*, a user preference manager 103, and a user preference profile 105. Network 107 may communicatively couple the user transactional devices 101*a*-101*d* to a computer 109 upon which the user preference manager 103 runs. It will be understood that, while computer 109 is shown as a single device, one or more devices could be used. For example, computer 109 may be a cloud computing solution with many servers, storage area networks, and networking infrastructure to provide high-availability service for the user preference manager 103. System 100 may also include a web-based portal 111.

User transaction terminals 101 may include any device where a customer interacts with an organization to perform a transaction. In some examples, user transaction terminals 101 may include automatic teller machines 101a ("ATMs"), fuel pumps 101b, self-service checkout ("SCO") lanes 101c, and mobile terminals (e.g., smart phones), among others (e.g., point-of-sale registers, item dispensers, etc.). In some examples, user transaction terminals 101 may include a user interface to interact with customers. In some examples, the user transaction terminals 101 are communicatively coupled to the user preference manager 103 via, for example, network 107. Network 107 may be the internet, a cellular network, a satellite network, or any other electronic communication technology, or combination of communications technologies, to allow near real-time communication between the user transaction terminals 101 and the user preference manager 103. In some examples, user transaction terminals 101 may be classified into device types based on one or more of the following: device purpose (e.g., ATM 101a vs. fuel pump 101b); device manufacturer; and device user interface characteristics (e.g., screen size, screen resolution, available screen colors, user input modes such as keyboard, touch screen, etc.) among others. Other possible characteristics of the user transaction terminals 101 are described below with respect to FIG. 2.

The user preference manager 103 may house and manage user preference profiles 105. In some examples, the user preference manager 103 may load balance the user preference profile 105 data across multiple databases. In some examples, the user preference profile's 105 data may migrate between databases to keep the data distributed across more than one database node. In some examples, the data may be distributed across all database nodes. In some examples, the user preferences manager 103 may have one or more of its operations distributed across one or more hardware devices. In some examples, high-availability architecture may support the user preferences manager 103 for greater up-time and availability.

The user preference manager 103 may provide remote access to the user preference profile 105. Remote access may be provided through one or more remote procedure interfaces. In some examples, the remote access may be a remote procedure call interface. In some examples the interface may include one or more of a get preferences call, a set preferences call, or a dynamic preferences call. In some examples, the remote procedure call interface is a web services interface. In some examples, the web services interface may be an extensible markup language ("XML") based interface. In some examples the web services interface may be simple object access protocol ("SOAP") or POST compatible.

The user preference manager 103 may respond to a preference request by a user transaction terminal 101 and return the value of the requested preference. In some examples, the communication between the user transaction terminal 101 and the user preference manager 103 is encrypted. In some examples, the user preference manager 103 restricts access to a user preference in the user preference profile 105 based on an access control list. In some examples, the access control list may specify whether a particular user transaction terminal 101, user transaction terminal device type, or an entity (e.g., a customer or user), has read, or read/write access to a particular user preference. In some examples, a default user preference profile 105 may be created when the user preference manager 103 receives a preference request pertaining to a customer without an associated user preference profile 105.

The user preference manager 103 may also receive a dynamic preference from a user transaction terminal 101 and extend the user preference profile 105 with the dynamic preference. Dynamic user preferences may be considered ad-hoc extensions of the user preference profile 105. In some examples, any user transactional device 101a-101d may create a dynamic preference. In some examples, dynamic preferences are specific to a type of device, (e.g., a fuel pump 101b). In some examples, the dynamic user preference may include a preference definition (e.g., a preference name, data type, possible values, etc.). In some examples, the preference definition may include read and write access controls. In some examples, the access controls indicate what services or entities may view or update a dynamic preference. For example, a preference storing observed customer data, such as purchasing velocity, may not be visible by the customer. In another example, a dynamic user preference may restrict read and write access to SCO lanes 101c.

The user preference manager 103 may also manage languages. In some examples the user preference manager 103 may map a phrase library to an external interface. In some examples, the mapping is accomplished though an ID assigned to the external interface and associated with a particular phrase library. In some examples, a user transaction terminal 101 may request and receive a language appropriate phrase base on the interface and a language preference for a customer in the user preference profile 105. In some examples, the user preference manager's 103 remote interfaces may be extended to include a set, get, or delete phrase procedure calls.

The user preference manager 103 may manage interface themes for the user transaction terminals 101. In some examples, themes may include colors, fonts, images, sounds, or other elements to modify a user interface. In some examples, themes may be available for a particular type of user transaction terminals 101. For example, theme A may be available for mobile devices 101d only, while theme B may be available for SCO 101c and ATMs 101a, while theme C is available for all user transaction terminals 101. In some examples, the user preference manager's 103 remote interfaces may be extended to include a get themes procedure call to return the themes available for a user transaction terminal 101.

The user preference profile 105 may include such preferences as email, member card, alternate id, phone number, and address, among others. In some examples, the base set of user preferences may include, and be defined as, one or more of those in the following table:

| Preference Name | DataType | Description |
| --- | --- | --- |
| FirstName | String | |
| LastName | String | |
| Gender | Integer | 0 = Not Specified<br>1 = Male<br>2 = Female |
| Contact Preference | Integer | 0 = Not Specified<br>1 = Direct Mail<br>2 = Text message Mobile<br>3 = Email<br>4 = Home Phone<br>5 = Work Phone |
| Contact Preference Index | Integer | Index of contact (i.e. Address 1 vs Address 0) |
| CardNumber1 | String | A customers identifier card |
| CardType1 | Integer | The type of customer identifier card |

-continued

| Preference Name | DataType | Description |
| --- | --- | --- |
| CardNumberN | String | |
| CardTypeN | Integer | |
| HomePhoneNumberN | String | |
| MobilePhoneNumberN | | |
| WorkPhoneNumberN | String | |
| Primary Address | String | |
| PrimaryCity | String | |
| PrimaryState | String | |
| PrimaryZip | String | |
| AddressN | String | |
| CityN | String | |
| StateN | String | |
| ZipN | String | |
| Pin | String | Pin/Passcode used for authentication (NOT PASSED TO CLIENTS) |
| HouseholdPK | Integer | The household this customer belongs to if this is not a household record, if this is a household record this value is 0 |
| CustomerPK | Integer | The primary internal identifier for this customer record (database primary key) |
| PrimaryEmail | String | |
| EmailN | String | |
| ReceiptEmail | String | |
| DateOfBirth | Date | |
| CreationDate | Date | Date this customer record was created |
| LastUpdate | Date | The last time this customer record was updated |
| Status | Integer | TBD (i.e. active, inactive) |
| Language | Integer | 0 = English<br>1 = Spanish<br>2 = German<br>3 = Italian<br>(TBD) |
| Receipt | Integer | 0 = Print<br>1 = Email Primary<br>2 = Email Receipt email<br>3 = None<br>4 = Inquiry |

In some examples, user preferences may include one or more personal identifiers, personal information about a customer, and one or more actionable attributes. In some examples, actionable attributes may include a list of options from which a value may be obtained. For example, an actionable attribute of "Card Level" may be associated with a list of values such as "Silver", "Gold", and "Platinum".

The web-based portal 111 may provide an interface for a customer to view, modify, or delete one or more user preferences in the user preference profile 105. In some examples, the web-based portal may receive an initial set of user preference selections and create a user preference profile 105. In some examples, the web-based portal 111 resides on the same hardware 109 as the user preference manager 103. In some examples, the web-based portal 111 resides on different hardware than the user preference manager 103. In some examples, the web-based portal 111 is supported on a high-availability platform. In some examples, the web-based portal 111 is considered another user transactional device 101 for various purposes. For example, the web-based portal 111 may be themed as described above with respect to the user transactional devices 101.

Figure 2:
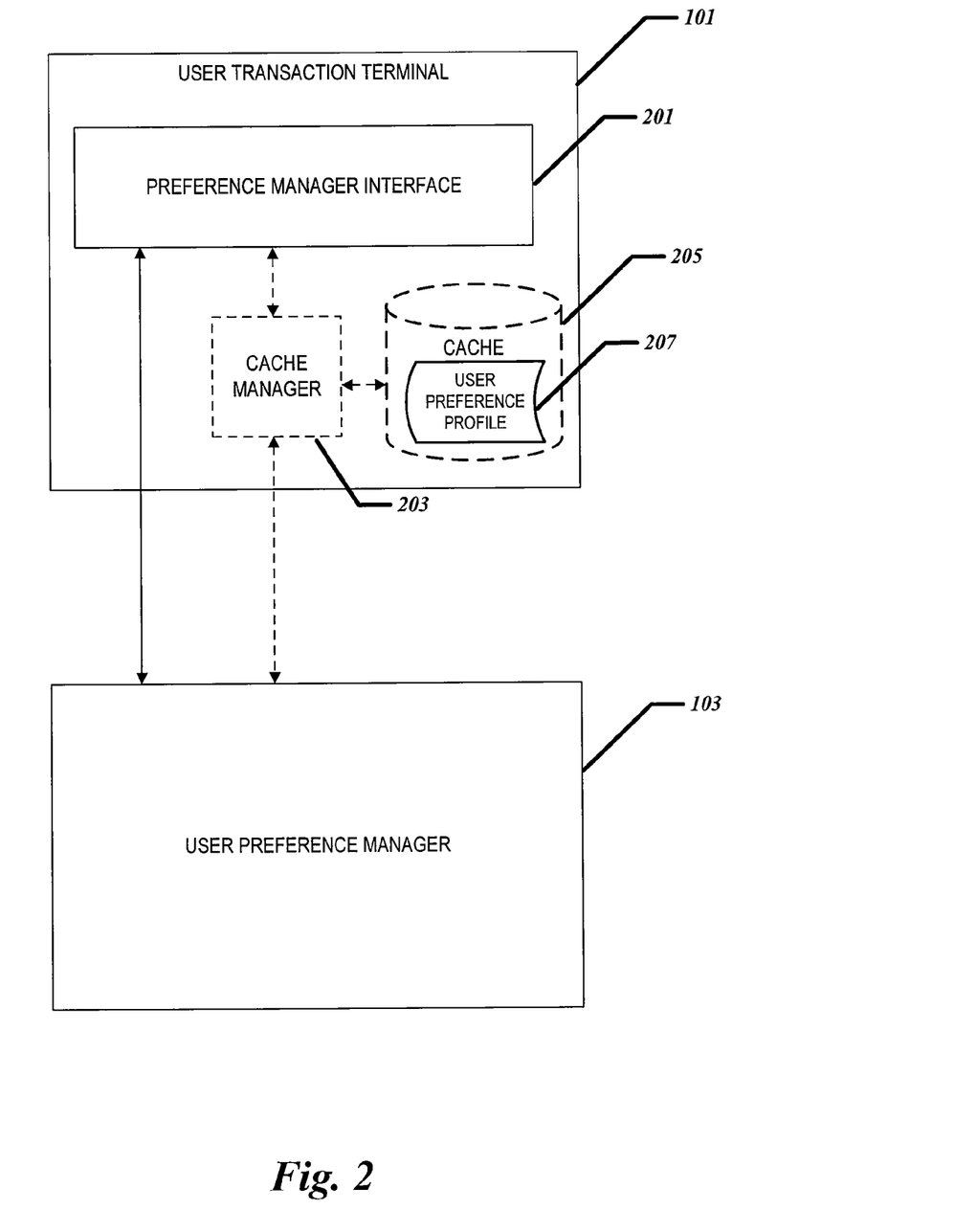
FIG. 2 is a block diagram of possible components for example embodiments of a user transaction terminal and a user preference manager.

FIG. 2 is a block diagram of possible components for example embodiments of a user transaction terminal 101 and a user preference manager 103. User transaction terminal 101 may include a preference manager interface 201, and may, in some examples, optionally include a cache manager 203, a local cache 205, and a local user preference profile 207.

The preference manager interface 201 may communicate with the user preference manager 103 to get preferences from the user preference profile 105, update preferences from the user preference profile 105, and create dynamic user preferences. In some examples, the preference manager interface 201 handles all communication between the user transaction terminal 101 and the user preference manager 103. In some examples, the preference manager interface 201 observes customer behavior on the user transaction terminal 101 and updates one or more user preferences in the user preference profile 105 associated with the observed customer behavior. For example, if a user purchases fuel and a car wash at a fuel pump 101b, the preference manager interface 201 may update a preference associated with purchasing velocity of fuel, a preference associated with purchasing velocity of car washes, and a preference associated with a location for the fuel pump 101b.

The preference manager interface 201 may include a set of user preferences specific to the user transaction terminal 101. In some examples, the set of user preferences may be specific to the particular user transaction terminal 101 or to the user transaction terminal device type of user transaction terminal 101. In some examples, the preference manager interface 201 may determine if the user preference profile 105 for a current customer is missing any of the set of user preferences specific to the user transaction terminal 101 and create dynamic user preferences for the missing user preferences.

The optional cache manager 203 may manage a local user preference profile 207 in a local cache device 205. In some examples, the local cache device 205 may be a non-volatile solid state memory (e.g., flash) device, a volatile solid state memory (e.g., RAM), a hard disk drive, or other storage medium in which to store the local user preference profile 207. In some examples, the local cache 205 may be a portion or segment of memory or storage in use by the user transaction terminal 101 to perform other operations of the user transaction terminal 101 (e.g., to process payment, dispense product, etc.).

The cache manager 203 may manage the local user preference profile 207 by refreshing it from the centralized user preference profile 105. In some examples, the cache manager 203 includes an indication of the freshness of one or more user preferences in the local user preference profile 207. In some examples, the cache manager 203 requests a user preference from the user preferences manager 103 when that user preference is stale, or not fresh, in the local user preference profile 207. In some examples, a request for a stale user preference occurs when the user preference is requested from the preference manager interface 201. In some examples, the cache manager 203 receives all user preference manager 103 requests from the preference manager interface 201, or other component of the user transaction terminal 101, and replies with a user preference from the local user preference profile 207 if the user preference is fresh, or communicates with the user preference manager 103 for the reply, updating the local user preference profile 207 with data from the same reply.

Figure 3:
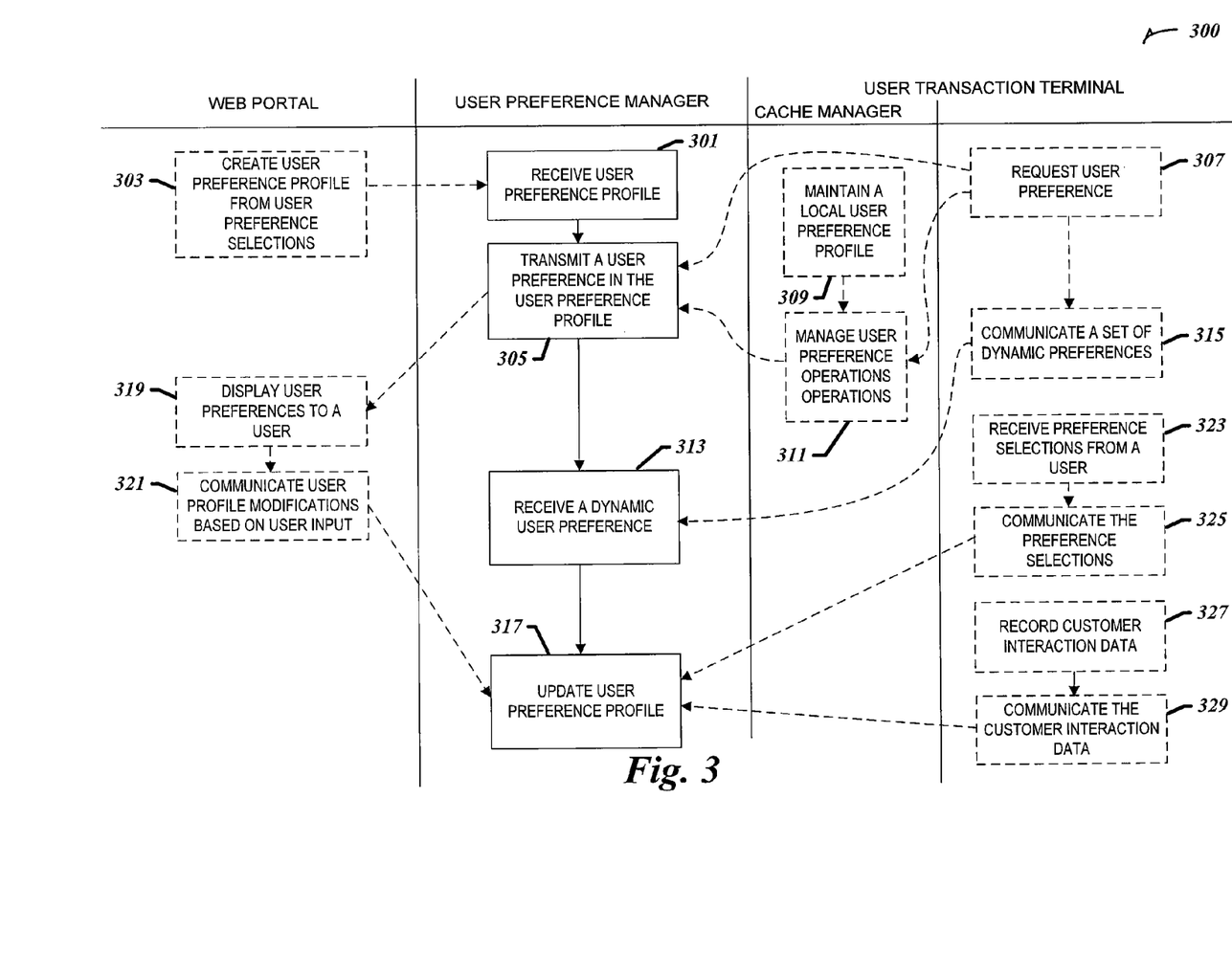
FIG. 3 is a swim-lane flowchart illustrating an example method of centralized user preference management for electronic decision making devices.

FIG. 3 is a swim-lane flowchart illustrating an example method 300 of centralized user preference management for electronic decision making devices. Dashed lines and blocks indicate optional elements of method 300. Components previously illustrated in FIGS. 1 and 2 may be used in the following description for illustrative purposes, however, other physical and logical components are also contemplated.

At 301a user preference manager 103 receives a user preference profile 105 associated with a user.

At 303 a web-based portal 111 may optionally create the user preference profile 105 received at 301 from user preference selections received at the web-based portal 111.

At 305 the user preference manager 103 transmits a user preference from the user preference profile 105 to user transaction terminal 101 making a request for the user preference at 307.

At 309 a cache manager 203 of the user transaction terminal 101 maintains a local user preference profile 207 at the user transaction terminal 101. In some examples, maintain the local user preference profile 207 includes refreshing one or more user preferences in the local user preference profile 207 from the user preference manager 103.

At 311 the cache manager 203 may manage user preference operations for the user transaction terminal 101. For example, if the cache manager 203 exists on a user transaction terminal 101 and is operational, all user preference requests, updates, and other operations may be directed to the cache manager 203. The cache manager 203 may then perform the operation on the local user preference profile 207 and communicate with the user preference manager 103 to operate on the central user preference profile 105 as needed. Here, to illustrate the effect of the cache manager 203, the cache manager 203 is only shown to intercept the user preference request 307, however, other operations may also be intercepted. Conversely, without a cache manager 203, other components of the user transaction terminal 101 (e.g., the preference manager interface 201) may communicate directly with the user preference manager 103.

At 313 the user preference manager 103 may receive a dynamic user preference from the user transaction terminal 101. In some examples, the received dynamic user preference may include a user preference definition which also includes access controls to control read and write access to the dynamic user preference. The dynamic user preference may then extend the user preference profile 105 associated with the user.

At 315 the dynamic user preference may be communicated from the user transaction terminal 101 because it is one of a set of dynamic user preferences configured on the user transaction terminal 101 and missing from the user preference profile 105. In some examples, the user transaction terminal 101 may determine the missing dynamic user preferences after receiving the user preference profile 105 and comparing it with an internal set of user preferences. In some examples, the internal set of user preferences may be based on device type, location, or other factors characterizing the user transaction terminal 101.

At 317 the user preference manager 103 may update the user preference profile 105 based on data received from the user transaction terminal 101.

At 319 the web-based portal 111 may display user preference from the user preference profile 105 to the user to which the user has read access. For example, the user may have read access to an email user preference, but not to a fuel purchasing velocity user preference, and so the fuel purchasing velocity user preference would not be displayed.

At 321 the web-based portal 111 may accept modifications to existing user preferences and communicate them to the user preference manager 103 to update the user preference profile 105 at 317. In some examples, only modifications for user preferences to which the user has write access are accepted.

At 323 the user transaction terminal 101 may receive user preference selections from the user. For example, a user at an ATM 101a may select a preferred email address at a user interface of the ATM. In another example, the user may select a theme or a language preference.

At 325 the user preference selections of 323 may then be communicated to the user preference manager 103 to modify user preferences, at 317, in the user preference profile 105 associated with the user selections. In some examples, the user preference selections correspond directly to a user preference in the user preference profile 105 (e.g., email address preference and email address selection). In some examples, user preferences in the user preference profile 105 do not correspond directly with the user preference selections, but rather are associated. For example, if a user selection of "here" is given in response to home town, user preferences for city and state, may be updated based on data in the user transaction terminal 101.

At 327 the user transaction terminal 101 may record customer interaction data associated with the user. In some examples, the customer interaction data may include, what the user is purchasing, what types of items are being purchased, the quantities of items being purchased, items browsed but not purchased, time spent on an interface, location of the user transaction terminal 101, and other factors which may be observed while a user is interacting with the user transaction terminal 101.

At 329 the recorded customer interaction data may then be communicated to the user preference manager 103 to modify user preferences, at 317, in the user preference profile 105 associated with the customer interaction data. In some examples, the user preference selections correspond directly to a user preference in the user preference profile 105 (e.g., last known location). In some examples, user preferences in the user preference profile 105 do not correspond directly with the user preference selections, but rather are associated. For example, metrics describing user interaction with a terminal may be used as components to one or more user preferences dealing with purchasing velocity for several products.

Figure 4:
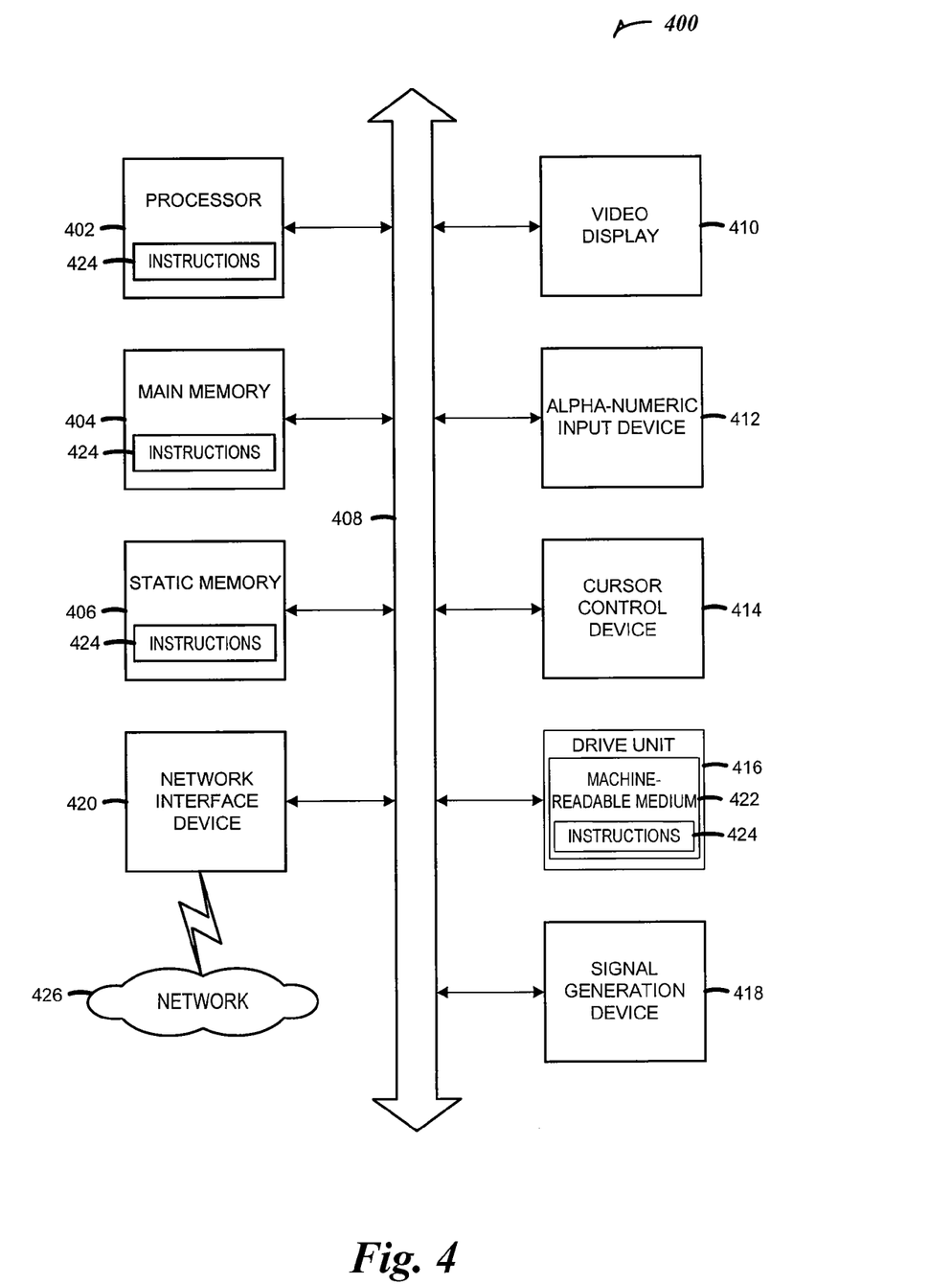
FIG. 4 is a diagrammatic representation illustrating a machine in the example form of a computer system which may be may be part of an example embodiment.

FIG. 4 shows a diagrammatic representation of machine in the example form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU) a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a cursor control device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions (e.g., software 424) embodying any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the inventive subject matter. The term "machine-readable medium" shall accordingly be taken to include, but not be limited to, solid-state memories, optical and magnetic media, and carrier wave signals. The term "tangible machine-readable medium" shall be taken to include, machine-readable media that is in tangible form, including, but not limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   a plurality of user transaction terminals including a plurality of device types, a device type of the plurality of device types being one of a self-service checkout terminal, an automatic teller machine, or a product dispenser, the self-service checkout terminal being a physical terminal controlled by a retailer; and
   at least one server distinct from the plurality of user transaction terminals, the at least one server comprising:
   one or more hardware processors; and
   a user preference manager configured to be communicatively coupled to the plurality of user transaction terminals, the user preference manager configured to:
   receive, using the one or more hardware processors of the at least one server, a user preference profile corresponding to a user, the user preference profile including a plurality of user preferences, the plurality of user preferences configured to be used locally by the plurality of transaction terminals to modify the behavior of the plurality of user transaction terminals;
   transmit, responsive to a request for a user preference from a user transaction terminal in the plurality of user transaction terminals, the user preference from the user preference profile to a cache manager of the user transaction terminal, the cache manager configured to maintain the user preference in a user preference profile local to the user transaction terminal, the cache manager configured to request the user preference in response to determining that the user preference is stale, the user preference configured to be used locally by the user transaction terminal and the user preference specifying an attribute of a behavior of the user transaction terminal;
   receive a dynamic user preference from the user transaction terminal to extend the user preference profile, the dynamic user preference including a preference definition, the preference definition including access controls to control read and write access to the dynamic user preference, the dynamic user preference being specific to a device type of the user transaction terminal; and
   update the user preference profile based on data received from the plurality of user transaction terminals.

2. The system of claim 1, further comprising a web-based portal configured to:
   receive initial user preferences from a user to create the user preference profile;
   communicate the user preference profile to the user preference manager; and
   display, to the user, existing user preferences in the user preference profile to which the user has read access; and
   communicate, to the user preference manager, modifications to the existing user preferences to which the user has write access, the modifications based on input received from the user.

3. The system of claim 1, wherein the plurality of user transaction terminals are configured to receive preference selections from the user and to communicate the preference selections to the user preference manager, and wherein to update the user preference profile includes modifying user preferences in the user preference profile corresponding to the preference selections.

4. The system of claim 1, wherein the plurality of user transaction terminals are configured to record customer interaction data corresponding to the user and transmit the customer interaction data to the user preference manager, and wherein to update the user preference profile includes modifying user preferences in the user preference profile corresponding to the customer interaction data.

5. The system of claim 1, wherein a user transaction terminal in the plurality of user transaction terminals include a preference manager interface, the preference manager interface configured to communicate a set of dynamic user preferences to the user preference manager, the set of dynamic user preferences consisting of user preferences configured in the user transaction terminal and absent from the user preference profile.

6. The system of claim 1, wherein the cache manager configured to:
   maintain at least a portion of the user preference profile in a cache local to the user transaction terminal; and
   manage user preference operations by the user transaction terminal.

7. In a system with a plurality of user transaction terminals, a method comprising:
   receiving, by at least one server, which is distinct from the plurality of user transaction terminals, using one or more hardware processors, a user preference profile corresponding to a user the user preference profile including a plurality of user preferences, the plurality of user preferences configured to be used locally by the plurality of transaction terminals to modify the behavior of the plurality of user transaction terminals, the plurality of transaction terminals including a plurality of device types, a device type of the plurality of device types being one of a self-service checkout terminal, an automatic teller machine, or a product dispenser, the self-service checkout terminal being a physical terminal controlled by a retailer;

transmitting, by the at least one server using the one or more hardware processors in response responsive to a request for a user preference from a user transaction terminal in the plurality of user transaction terminals, the user preference from the user preference profile to a cache manager of the transaction terminal, the cache manager configured to maintain the user preference in a user preference profile local to the user transaction terminal, the cache manager configured to request the user preference in response to determining that the user preference is stale, the user preference configured to be used locally by the user transaction terminal and the user preference specifying an attribute of a behavior of the user transaction terminal;

receiving, by the at least one server using the one or more hardware processors, a dynamic user preference from the user transaction terminal to extend the user preference profile, the dynamic user preference including a preference definition, the preference definition including access controls to control read and write access to the dynamic user preference, the dynamic user preference being specific to a device type of the user transaction terminal; and updating, by the at least one server using the one or more hardware processors, the user preference profile based on data received from the plurality of user transaction terminals.

8. The method of claim 7, wherein receiving the user preference profile corresponding to the user includes:
creating the user preference profile from user preference selections received at a web-based portal;
displaying, to the user via the web-based portal, existing user preferences in the user preference profile to which the user has read access; and
receiving modifications to the existing user preferences in the user preference profile to which the user has write access, the modifications based on input received from the user via the web-based portal.

9. The method of claim 7, further comprising:
receiving, by the plurality of user transaction terminals, preference selections from the user;
communicating the preference selections to the user preference manager at least one server; and
wherein updating the user preference profile includes modifying user preferences in the user preference profile corresponding to the preference selections.

10. The method of claim 7, further comprising:
recording, by the plurality of user transaction terminals, customer interaction data corresponding to the user;
communicating the customer interaction data to the user preference manager at least one server; and
wherein updating the user preference profile includes modifying user preferences in the user preference profile corresponding to the customer interaction data.

11. The method of claim 7, further comprising communicating, by a user transaction terminal in the plurality of user transaction terminals, a set of dynamic user preferences to the user preference manager at least one server, the set of dynamic user preferences consisting of user preferences configured in the user transaction terminal and absent from the user preference profile.

12. The method of claim 7, further comprising:
maintaining, by the cache manager of a user transaction terminal in the plurality of user transaction terminals, at least a portion of the user preference profile in a cache local to the user transaction terminal; and
managing user preference operations by the user transaction terminal.

13. A non-transitory machine-readable medium storing instructions that, when executed by a machine implemented by computer hardware, cause the machine to:
receive, by a preference manager implemented by at least one server machine, a user preference profile corresponding to a user the user preference profile including a plurality of user preferences, the plurality of user preferences configured to be used locally by the plurality of transaction terminals to modify the behavior of the plurality of user transaction terminals, the plurality of transaction terminals including a plurality of device types, a device type of the plurality of device types being one of a self-service checkout terminal, an automatic teller machine, or a product dispenser, the self-service checkout terminal being a physical terminal controlled by a retailer, the at least one server machine being distinct from the plurality of transaction terminals;

transmit, by the at least one server machine in response responsive to a request for a user preference from a user transaction terminal in a plurality of user transaction terminals, the user preference from the user preference profile to a cache manager of the transaction terminal, the cache manager configured to maintain the user preference in a user preference profile local to the user transaction terminal, the cache manager configured to request the user preference in response to determining that the user preference is stale, the user preference configured to be used locally by the user transaction terminal and the user preference specifying an attribute of a behavior of the user transaction terminal;

receive, by the at least one server machine, a dynamic user preference from the user transaction terminal to extend the user preference profile, the dynamic user preference including a preference definition, the preference definition including access controls to control read and write access to the dynamic user preference, the dynamic user preference being specific to a device type of the user transaction terminal; and update, by the at least one server machine, the user preference profile based on data received from the user transaction terminals.

14. The machine-readable medium of claim 13, wherein to receive the user preference profile corresponding to the user includes:
creating the user preference profile from user preference selections received at a web-based portal;
communicating, by the web-based portal, the user preference profile to the user preference manager;
displaying, to the user, existing user preferences in the user preference profile to which the user has read access; and
communicating, by the web-based portal, modifications to the existing user preferences in the user preference profile to which the user has write access, the modifications based on input received from the user.

15. The machine-readable medium of claim 13, further comprising:
    to receive, by the plurality of user transaction terminals, initial user preferences from the user;
    to communicate the preference selections to the user preference manager; and
    wherein to update the user preference profile includes modifying user preferences in the user preference profile corresponding to the preference selections.

16. The machine-readable medium of claim 13, further comprising:
    to record, by the plurality of user transaction terminals, customer interaction data corresponding to the user;
    to communicate the customer interaction data to the user preference manager; and
    wherein to update the user preference profile includes modifying user preferences in the user preference profile corresponding to the customer interaction data.

17. The machine-readable medium of claim 13, further comprising, to communicate, by a user transaction terminal in the plurality of user transaction terminals, a set of dynamic user preferences to the user preference manager, the set of dynamic user preferences consisting of user preferences configured in the user transaction terminal and absent from the user preference profile.

18. The machine-readable medium of claim 13, further comprising:
    to maintain, by the cache manager of a user transaction terminal in the plurality of user transaction terminals, at least a portion of the user preference profile in a cache local to the user transaction terminal; and
    to manage user preference operations by the user transaction terminal.

* * * * *